April 12, 1966  D. A. OGILVIE  3,245,713
PICKUP TRUCK BODY CONSTRUCTION
Filed Jan. 8, 1964  2 Sheets-Sheet 1

Douglas A. Ogilvie
INVENTOR.

April 12, 1966  D. A. OGILVIE  3,245,713
PICKUP TRUCK BODY CONSTRUCTION
Filed Jan. 8, 1964  2 Sheets-Sheet 2

Douglas A. Ogilvie
INVENTOR.

3,245,713
PICKUP TRUCK BODY CONSTRUCTION
Douglas A. Ogilvie, Appleton, Wis., assignor to Pierce Auto Body Works, Inc., Appleton, Wis., a corporation of Wisconsin
Filed Jan. 8, 1964, Ser. No. 336,425
5 Claims. (Cl. 296—24)

This invention relates to a novel and useful pickup truck body construction and more specifically to a novel and useful body construction adapted primarily for mounting on the frame of a pickup truck and constructed in a manner whereby numerous individual compartments are formed thereby providing a large amount of usable space for carrying and storing various forms of special equipment and parts.

The truck body construction of the instant invention is constructed of readily available sheet material and various pieces of commercially available hardware and is designed in a manner whereby its construction will provide an extremely durable and compact unit at a relative low cost.

In addition, the various individual compartments of the truck body construction include movable closure panels whereby the various compartments may be separately closed and locked. Further, the truck body construction is designed in a manner whereby the various basic compartments formed thereby may be readily modified so as to specifically adapt the body construction for handling a particular line of specific equipment and parts.

The main object of this invention is to provide a truck body construction including longitudinally extending opposite side upper compartments including swingable "flip-up" closures including partial top wall sections and depending side wall sections whereby the upper compartments provide access thereto, when said closures are open from the top as well as from the side.

Another object of this invention is to provide a truck body construction that will readily adapt itself to securement to the frame of a pickup truck and that will provide a plurality of individual adjustable size compartments well suited for transportation and storing various types of special equipment and parts.

A further object of this invention, in accordance with the immediately preceding object, is to provide a truck body construction whose individual compartments are provided with separate individually lockable closure panels thereby adapting the body construction for use as a service truck or the like whereby various individual compartments thereof may be entered at various intervals without opening all of the storage space of the body construction.

Still another object of this invention is to provide a truck body construction including various individually closable separate compartments with some of the individual compartments being communicated with each other interiorly of the truck body construction.

Another object of this invention is to provide a truck body construction including basic individual compartments constructed in a manner whereby the individual compartments may be readily modified so as to be specifically adapted to store and support a particular type of merchandise.

A final object of this invention to be specifically enumerated herein is to provide a pickup truck body construction in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
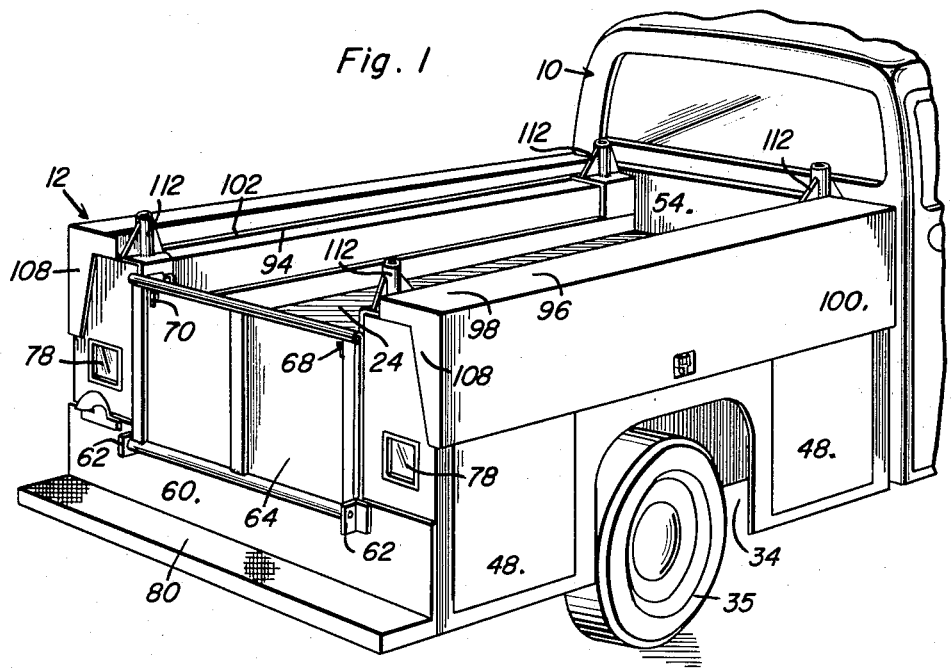
FIGURE 1 is a fragmentary perspective view of a conventional form of pickup truck shown with the body construction of the instant invention mounted on the rear of the frame portion of the pickup truck.
Figure 2:
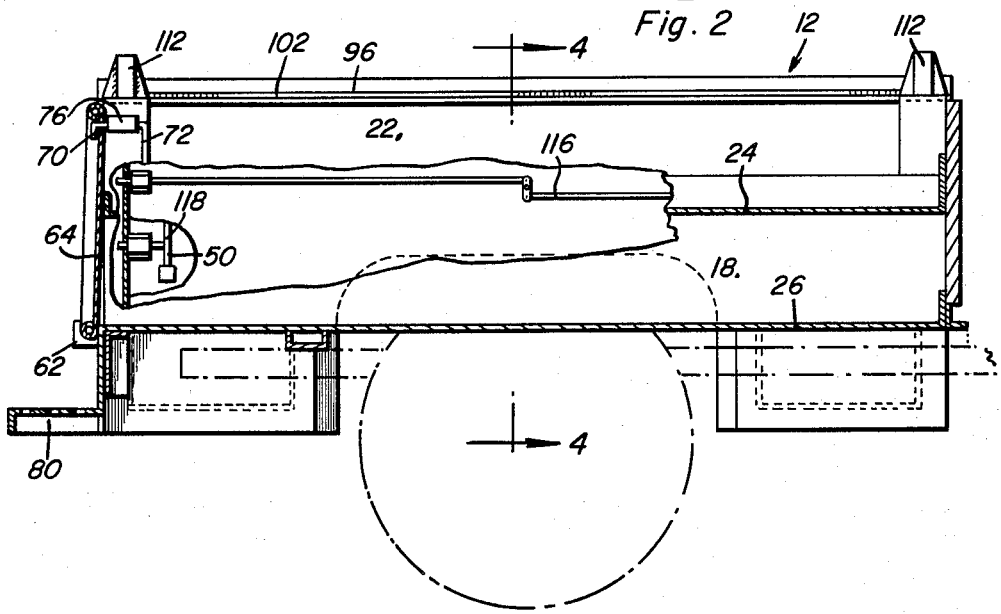
FIGURE 2 is a fragmentary longitudinal vertical sectional view taken substantially upon a plane passing through the longitudinal center line of the truck body construction, portions of the body construction being broken away and shown in section to more clearly illustrate some of the hidden structural details thereof.

Referring now more specifically to the drawings the numeral 10 generally designates a pickup truck on the frame of which is mounted the body construction of the instant invention which is generally designated by the reference numeral 12.

The body construction 12 includes a pair of generally parallel upright and horizontally elongated side compartment housings 14 and 16 interconnected by means of a generally horizontally disposed an elongated central compartment housing 18. The side compartment housings 14 and 16 include adjacent inner longitudinal panels 20 and 22 and the center compartment housing 18 is defined by means of an upper panel 24 and a lower panel 26 extending between the inner longitudinal panels 20 and 22.

The side compartment housings 14 and 16 each includes an upper longitudinal section 28 and a pair of opposite end depending sections 30 and 32. The depending sections 30 and 32 of each side compartment housing are spaced longitudinally of the latter and define a downwardly opening wheel well 34 for receiving the corresponding rear wheel 35 of the truck 10.

The opposite ends of the side compartment housings 14 and 16 are defined by front and rear panels 36 and 38 and the rear wall of each forward depending section 30 is defined by a rear panel 42 while the forward wall of each rear depending section 32 is defined by a front panel 44.

It will be noted that each of the depending sections 30 and 32 projects below the lower panel 26 of the center compartment housing 18 and that each is provided with a bottom panel 46. Further, each of the sections 30 and 32 is provided with a hinged door 48 including a latch mechanism 50, the doors 48 being swingably mounted by means of piano-type hinges 52.

It is to be noted that the front panel 36 for each side compartment housing comprises a portion of a main front panel 54 which extends across the full width of the body construction 12 and also defines a front wall for the center compartment housing 18. In addition, it will be noted that the side compartment housings 14 and 16 project above the center compartment housing 18 as well as below the latter and that the main front panel 54 also defines a front wall for the top compartment 58 defined between the upper portions of the inner longitudinal panels 20 and 22. Further, a main rear panel 60 extends across the rear of the body construction 12 and between the depending portions of the rear depending sections 32 of the side compartment housings 14 and 16.

A pair of mounting flanges 62 are secured to and project rearwardly of the main rear panel 60 and the lower end of a swingable tailgate 64 is pivotally supported between the mounting flanges 62 for rotation about a generally horizontally disposed axis extending along the lower marginal edge portion of the tailgate 64. Further, it may be seen from FIGURE 3 of the drawings that the inner pannel 66 of the tailgate 64 defines a pair of opposite side generally horizontally disposed slots 68 in which the hooked ends 70 of a pair of latch members 72 are receivable when the hooked end portions 70 are substantially horizontally disposed. The latch members 72 include shaft portions 74 which are rotatably received in journals 76 secured to the rear portions of in the inner longitudinal panels 20 and 22. If it is desired, a pair of rear light assemblies 78 may be supported from the rear panels 38 and a rearwardly projecting and substantially horizontally disposed rear step 80 may be supported from the main rear panel 60.

Each of the longitudinal sections 28 includes a bottom panel 82 which extends between the corresponding front and rear panels 36 and 38. Each of the bottom panels 82 includes a stationary center section 84 and a pair of vertically adjustable opposite end sections 86. The opposite end sections 86 are vertically adjustably supported by means of pairs of front and rear apertured uprights 88 disposed in the corresponding depending section. The opposite end sections 86 include suitable hardware (not shown) which is secured thereto and is selectively engageable in selected ones of the apertures formed in the associated uprights 88.

Figure 3:
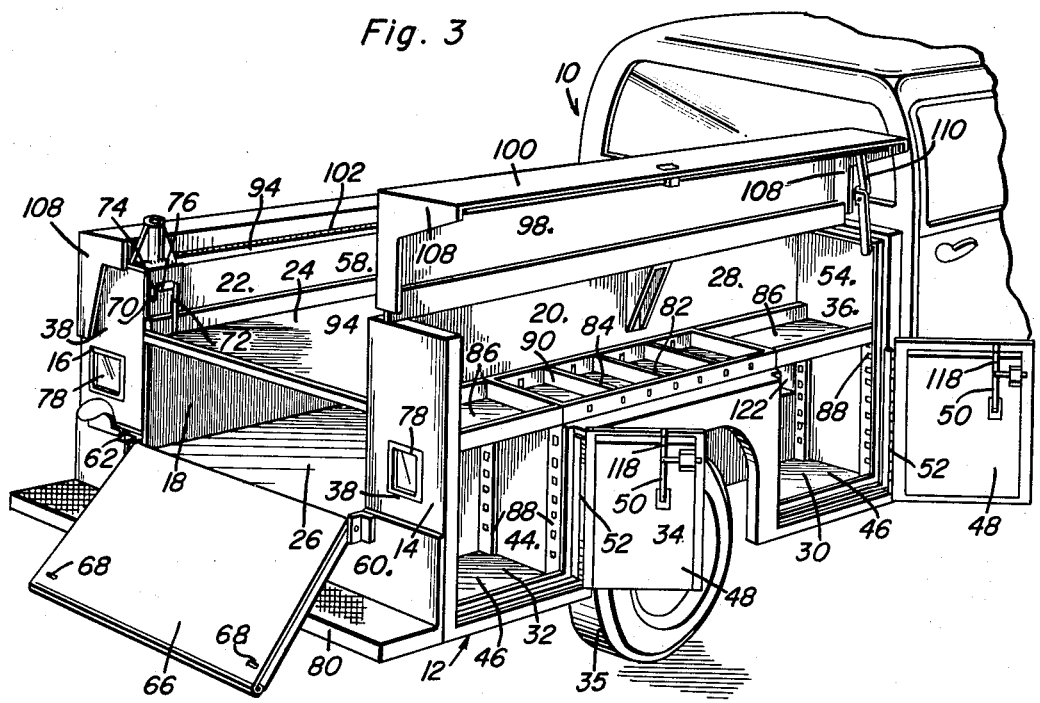
FIGURE 3 is a fragmentary perspective view similar to that of FIGURE 1 but showing several of the individual compartment closing panels in the open positions.

End sections 86 include upstanding wall portions defining an upwardly opening tray and it may be seen from FIGURE 3 of the drawings that the center sections 84 also include longitudinally adjustable and transversely extending partitions 90. By shifting the position of the partitions 90 the individual tray sections formed thereby may be adjusted in size so as to be readily adapted to receive special pieces or parts of equipment.

Figure 4:
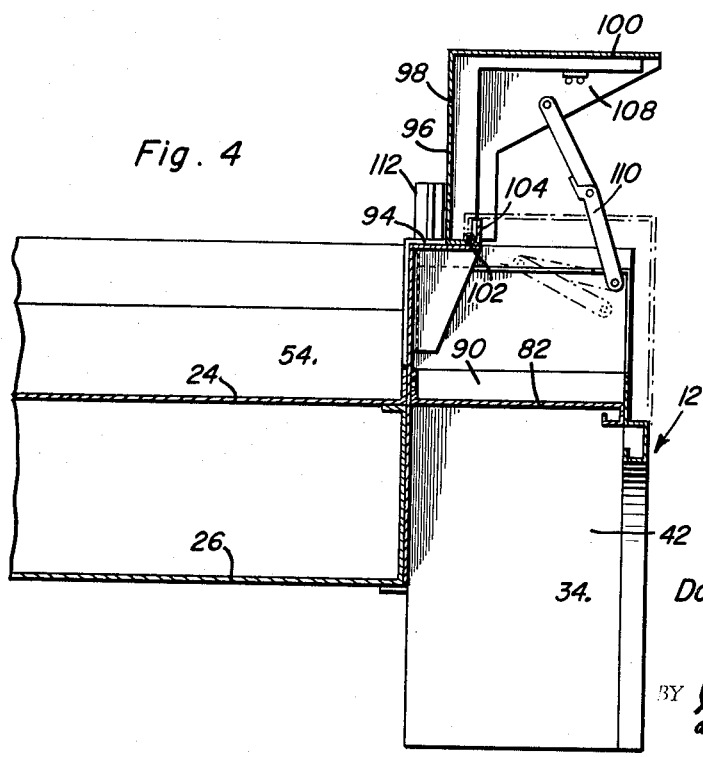
FIGURE 4 is an enlarged transverse vertical sectional view taken substantially upon the plane indicated by the section line 4—4 of FIGURE 2.
Figure 5:
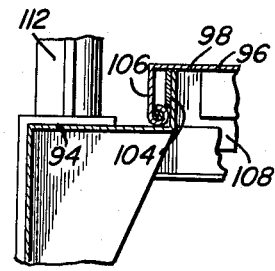
FIGURE 5 is a fragmentary transverse vertical sectional view similar to the upper right hand portion of FIGURE 4 but with the closure panel for the corresponding upper longitudinal section in a closed position.

From FIGURES 3-5 of the drawings it may be seen that the side compartment housings 14 and 16 each also includes a longitudinally extending inner partial top wall section 94 and a swingable closure cover 96. The swingable closure cover 96 includes an outer partial top wall section 98 and a generally right angled outer panel 100 for the associated longitudinal section 28. The adjacent longitudinal edge portions of the outer partial top wall section 98 are pivotally secured to the outer marginal edge portions of the inner partial top wall sections 94 by means of piano-type hinges 102 and it may seen from FIGURES 4 and 5 of the drawings that the inner partial top wall sections 94 each includes an upstanding flange 104 which extends along its outer marginal edge portion while each of the outer partial top wall sections 98 includes an inner angulated flange portion 106. It may be seen from FIGURE 5 of the drawings that the flange portions 104 and 106 form an overlapping joint with each other when the corresponding closure panel or door 96 is disposed in the closed position. Further, it may be seen that the inner and outer partial top wall sections 94 and 98 are slightly longer than the distance between the remote surfaces of the front and rear panels 36 and 38 and that each of the closure covers 96 includes a pair of opposite end bracing walls 108 which are lapped over the front and rear panels 36 and 38 when the closure cover 96 is in the closed position. In addition, a foldable support 110 is secured between each of the front panels 36 and the corresponding end bracing panel 108 for supporting the associated closure cover 96 in the open position.

The top compartment 58 includes a plurality of socket defining members 112 which are disposed in the four corners of the top compartment 58. These members 112 may have the lower ends of the four depending legs (not shown) of an elevated support frame (not shown) removably received therein for supporting the upper support frame above the top compartment 58. Such support frames are conventionally used to support ladders, service poles, and other relatively long pieces of equipment.

It may be seen from FIGURE 1 of the drawings that the free edge portion of the panel 100 overlaps the upper edge portions in the corresponding doors 48 when the doors 48 and the closure cover 96 are in the closed positions. In addition, the closure cover 96 includes a latch assembly 116 that may be actuated and locked in order to releasably secure the closure cover 96 in the closed position. From FIGURE 3 of the drawings it may be seen that the latch members 50 each includes an upstanding portion 118 that may be manipulated, upon the opening of the corresponding closure cover 96, to retract the latch member 50 and thus enable the doors 48 to be opened.

With attention now invited to FIGURE 3 of the drawings it may be seen that the inner longitudinal panels 20 and 22 have openings 122 formed therein which communicate the upper portions of the depending sections 30 and the forward end portion of the center compartment housing 18. The openings 122 each occupy substantially the entire area of transverse registry of the corresponding depending section 30.

Various ones of the partitions 90 may be adjusted as desired and in addition, each of the individual compartments formed by the body construction 12 may be provided with its own compartment dividers and/or special equipment handling means. In this manner, the basic body construction 12 may be readily modified so as to be specifically adapted to carry and store one particular type of equipment and/or parts.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A truck body constructed comprising a pair of generally parallel upright and horizontally elongated opposite side compartment housing means adapted to extend longitudinally of a truck frame and generally horizontally disposed elongated center compartment housing means generally paralleling and extending transversely between said side compartment means, each of said side compartment means, in side elevation, including an upper longitudinal section interconnecting a pair of opposite end depending sections spaced longitudinally of the corresponding longitudinal section and defining a downwardly opening wheel well between each of said upper longitudinal sections including at least an outer partial top wall including a depending outer wall section extending longitudinally thereof and pivoted along its inner longitudinal edge portion for rotation about a generally horizontally disposed axis extending longitudinally thereof for movement between a raised open position and a closed position closing the top portions and remote side portions of said longitudinal sections.

2. A truck body construction comprising a pair of generally parallel upright and horizontally elongated opposite side compartment housing means adapted to extend longitudinally of a truck frame and generally horizontally disposed elongated center compartment housing means generally paralleling and extending transversely between said side compartment means, each of said side compartment means, in side elevation, including an upper longitudinal section interconnecting a pair of opposite end depending sections spaced longitudinally of the corresponding longitudinal section and defining a downwardly opening wheel well therebetween, said pair of side compartment housing means including adjacent inner longitudinal panels, said center compartment housing means including vertically spaced upper and lower panels interconnected along their opposite side edge portions by means of said adjacent longitudinal panels, said upper longitudinal sections each including a generally horizontally disposed bottom wall extending between the remote ends of said depending sections, said depending sections including remote outer closure panels movable into and out of positions closing the outer sides of said depending sections, each of said upper longitudinal sections including at least an outer partial top wall having a depending outer wall section extending longitudinally thereof and pivoted along its inner longitudinal edge portion for rotation about a generally horizontally disposed axis extending longitudinally thereof for movement between a raised open position and a closed position closing the top portions and remote side portions of said longitudinal sections, said depending outer wall sections, when in the closed positions, including means locking said remote movable outer closure panels in the closed positions.

3. A truck body construction comprising horizontally elongated side compartment housing means adapted to extend longitudinally of a truck frame, said side compartment means in side elevation including an upper longitudinal section interconnecting a pair of opposite end depending sections spaced longitudinally of the longitudinal section and defining a downwardly opening wheel well therebetween, said upper longitudinal section including at least an outer partial top wall including a depending outer wall section extending longitudinally thereof and pivoted along its inner longitudinal edge portion for rotation about a generally horizontally disposed axis extending longitudinally of said longitudinal section for movement between a raised open position and a closed position closing the top and outer side portions of said longitudinal section.

4. A truck body construction comprising a pair of generally parallel upright and horizontally elongated opposite side compartment housing means adapted to extend longitudinally of a truck frame and including front and rear ends, upright front panel means extending between and interconnecting the front ends of said housing means, each of said side compartment means, in side elevation, including an upper longitudinal section interconnecting a pair of opposite end depending sections spaced longitudinally of the corresponding longitudinal section and defining a downwardly opening wheel well therebetween, said pair of side compartment housing means including adjacent upstanding inner longitudinal panels, a pair of vertically spaced and generally horizontal upper and lower panels disposed between said housing means and secured at their forward ends to said front panel means, said panels being secured along their opposite side edge portions to said adjacent longitudinal panels and defining an elongated center compartment disposed between said housing means open at its rear end and closed at said front end by said front panel means, said upper panel being disposed appreciably below the upper edges of said longitudinal panels and thereby defining, together with the upper portions of said longitudinal panels, an upwardly opening compartment above said center compartment, said adjacent longitudinal panels having openings formed therein opening into the forward portion of said center compartment thereby communicating the upper portions of the forwardmost depending sections by way of the forward end of said center compartment.

5. The combination of claim 4 wherein said openings each occupies substantially the entire area of the transverse registry of the corresponding depending section with said center compartment.

References Cited by the Examiner
UNITED STATES PATENTS

| | | | |
|---|---|---|---|
| 721,404 | 2/1903 | Wege | 296—24 X |
| 2,606,786 | 8/1952 | Howard | 296—24 X |
| 2,820,687 | 1/1958 | Waring | 296—37 X |
| 3,068,038 | 12/1962 | Douglass | 296—24 |

BENJAMIN HERSH, *Primary Examiner.*

MILTON BUCHLER, A. HARRY LEVY, *Examiners.*